Patented Feb. 22, 1938

2,108,936

UNITED STATES PATENT OFFICE 2,108,936

PREPARATION OF GLYCOLS FROM OXIDES OF OLEFINES

Paul Ferrero, Tertre, Corneille Vandendries, Baudour, and François Berbé, St. Ghislain, Belgium, assignors to Societe Carbochimique, Société Anonyme, Brussels, Belgium, a company of Belgium No Drawing. Application April 13, 1937, Serial No. 136,690. In Belgium May 7, 1936

3 Claims. (Cl. 260—156.5)

The preparation of glycols from oxides of olefines is based on the reaction of a molecule of water with a molecule of these oxides, as per:

$$C_nH_{2n}O + mH_2O = C_nH_{2n}(OH)_2 + m - 1H_2O$$

The speed of this hydration, however, is very slow in practice. In order that the reaction may be worked on an industrial scale, it has been proposed to accelerate it in various ways, as by operating under pressure, or in presence of catalysts.

The use of pressure requires complicated and costly apparatus, since the pressure quickly increases with the rise in operating temperatures, on account of the high vapour tension of the oxides of olefines.

The processes which employ catalysts have the advantage of permitting the use of simpler apparatus. Their chief inconvenience is that they yield glycol solutions which are soiled with impurities. In fact, the catalysts which are suitable for this purpose are of an acid character and they have to be eliminated when the reaction is terminated, lest the glycols be chemically altered in the course of the subsequent distillation. Most processes of this kind make use of sulphuric acid which is usually eliminated by precipitation in the form of its calcium or barium salts. However not only is such separation always incomplete, especially in the case of calcium sulphate, but there remain in the solution substantial amounts of sulphuric organic compounds, the calcium and barium salts of which do not precipitate and only separate, with charring, at the end of the distillation, soiling the apparatus, impeding their operation and lowering their output.

Other acids, as phosphoric acid, perchloric acid and nitric acid have been proposed in place of sulphuric acid. They however have proved to be even more difficult to eliminate.

The process according to our present invention has for its object to remove this inconvenience and to lead, by catalytic action, according to a very simple method, under atmospheric pressure, to the production of aqueous glycol solutions which are free from any mineral or organic salts. It is based on the use of a catalyst which affords a speed of reaction at least as great as any other process, and is adapted to be easily and completely removed after completion of the reaction. These conditions, we have discovered, are fulfilled by oxalic acid which has a sufficiently high constant of dissociation to ensure, like sulphuric acid, a quick and quantitative conversion of the oxides of olefines into glycols. Moreover, owing to the complete insolubility of its calcium salt and to the unforeseen fact that no complex compounds are formed which would escape precipitation as calcium salts, the catalyst can be wholly eliminated.

The process according to our invention therefore consists essentially in performing the hydration of oxides of olefines in presence of oxalic acid. Under these conditions the oxalic acid acts as a catalyst and a catalytic action is also exerted by the intermediate products of catalysis formed when olefine oxides are brought into contact with the aqueous solution of oxalic acid.

This process permits the use of much simpler apparatus than those required by the pressure processes, and it yields glycol solutions that are entirely free from impurities, which is an advantage over the catalytic processes used heretofore. It thus combines the advantages of both kinds of processes.

In practice the temperature is preferably kept between 50 and 100° C. during the hydration and the concentration of the catalyst may be from 0,1 to 0,5%, it being understood that these data are not limitative.

The removal from the glycol solutions of the oxalic acid in the form of calcium oxalate is easily obtained by the addition of a milk of lime, for example, to the solutions when still warm. Although the amounts of catalyst to be used are always small, the oxalic acid may easily be recovered from the precipitated calcium oxalate if desired. The use of barium salts, which are more costly, is of no advantage in this particular case.

Hereafter is an example of carrying out this process in a continuous manner.

Example

In an apparatus containing an aqueous solution of glycol at 20%, we introduce water and ethylene oxide in such proportions that the said concentration be maintained. Oxalic acid is present in the solution in the amount of 0,1%, and this percentage is constantly maintained in the solution by adding a suitable proportion of catalyst to the water added. The glycol produced is continuously withdrawn in form of a 20% solution. The temperature is kept at 75° C. Practically no unconverted oxide escapes from the apparatus which is operated under atmospheric pressure. The acid glycol solution which flows out is treated, while still at elevated temperature, by a 10% milk of lime, and the calcium oxalate formed is filtered out. The solution then is distilled in order to give anhydrous glycol. The total yield in glycols reaches 98 to 99%, of which 90% is in form of ethylene glycol, the surplus being diethylene glycol.

It is understood that the process is not limited to the conditions described in this example and that it is also applicable to other olefine oxides such as oxide of propylene. Likewise the respective yields of glycol and diglycol may be varied according to requirements, as is well known, by varying the amount of water present.

We claim:

1. In a catalytic process of preparing glycols, causing an oxide of olefine to react with water in the presence of oxalic acid, and then eliminating the oxalic acid.

2. In a catalytic process of preparing glycols, causing an oxide of olefine to react with water in the presence of oxalic acid, adding a compound of an alkaline earth metal capable of reacting with oxalic acid to form an insoluble alkaline earth oxalate and separating said oxalate.

3. In a catalytic process of preparing ethylene glycol, continuously adding to an aqueous solution of glycol at 20% water and ethylene oxide in such proportions that said concentration is maintained in the presence of about 0,1% of oxalic acid, continuously withdrawing the glycol produced in the form of a 20% solution, maintaining the reaction temperature at about 75° C., treating the outflowing acid glycol solution by a milk of lime and separating the calcium oxalate formed by filtration.

PAUL FERRERO.
CORNEILLE VANDENDRIES.
FRANÇOIS BERBÉ.